Aug. 19, 1941.  E. BECKER  2,252,693
CONTROL DEVICE FOR INTERNAL COMBUSTION ENGINES
Filed Aug. 17, 1937
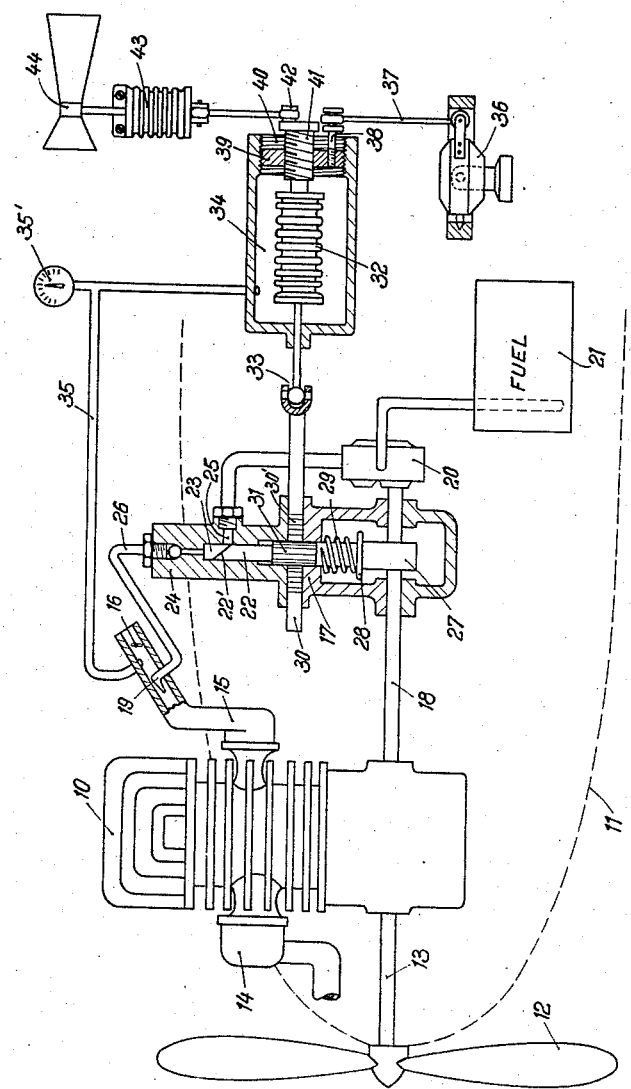
Inventor:
Ewald Becker Patented Aug. 19, 1941

2,252,693

UNITED STATES PATENT OFFICE 2,252,693

CONTROL DEVICE FOR INTERNAL COMBUSTION ENGINES

Ewald Becker, Berlin-Steglitz, Germany

Application August 17, 1937, Serial No. 159,598
In Germany August 17, 1936

12 Claims. (Cl. 123—140)

This invention relates to an improved control device for internal combustion engines on board aircraft.

The principal object of this invention is to provide for an internal combustion engine a fuel-air mixture the relative fuel and air content of which is adjusted in response to the condition of flight, as will become more apparent from the following consideration.

It may be assumed that a combustion engine is supplied with a fuel-air mixture which provides a most efficient combustion and that the aircraft is in horizontal flight. When the aircraft is caused to climb in response to an actuation of the elevator the speed of the engine is naturally decreased. Assuming further that the engine is supplied combustion air at a predetermined pressure which is either manually or automatically maintained constant it will be clear to any person skilled in the art that upon a decrease of the speed of the engine a greater volume of air per stroke of the engine is supplied to the same due to the decreasing flow resistance in the intake conduit of the engine. As, on the other hand, the amount of fuel per engine stroke remains constant, it follows that the engine upon climbing will be supplied a relatively thin fuel-air mixture, that is a mixture containing too little fuel. Since upon climbing the air speed decreases which limits the cooling of the engine and, on the other hand, the combustion temperature of a thinner mixture is greater than that of a normal mixture. It is easily understood that the engine will be liable to become overheated.

According to the present invention I therefore propose to adjust the relative fuel and air content in accordance with the inclination of the longitudinal axis of the craft with respect to the horizontal.

It is a further object of this invention to insure maximum economy by further correcting the relative fuel and air content in accordance with the velocity of the craft relative to the surrounding air.

The advantages of such further correction appear from the consideration that at relatively great velocities the mixture may be made thinner and fuel be saved, while at low speed and corresponding greater load of the engine the mixture has to be richer.

Further aims, objects and advantages of this invention will appear from a consideration of the description and the accompanying drawing showing for illustrative purposes an embodiment of this invention. It is to be understood that the description is not to be taken in a limiting sense the scope of the invention being defined in the appended claims.

Referring to the drawing, the figure shows diagrammatically an automatic control device responsive to velocity and inclination of the craft.

An internal combustion engine 10 is mounted in the fuselage 11 of an airplane for driving a propeller 12 secured to the crankshaft 13 of the engine. The engine is shown as having an exhaust conduit 14 and an air intake conduit 15 which in the illustrated example communicates with the atmosphere. The opening of the air intake conduit may be controlled by a throttle valve 16.

Fuel is supplied to the engine by means of a variable delivery pump 17 driven by the engine by means of a shaft 18. In the illustrated example a nozzle 19 for atomizing the fuel is shown as arranged within the air intake conduit 15. An auxiliary pump 20 which is shown to be of the gear type may be provided for supplying fuel from a tank 21 to the variable delivery pump 17. The variable delivery pump comprises a piston 22 which is rotatable and axially movable within a bore 23 of the pump head 24. The piston possesses a slanting top 22' cooperating with a fuel supply port 25. It becomes easily apparent from the drawing that the amount of fuel fed by the piston 22 into a supply conduit 26 depends on the relative position of the intake port and the slanting top of the piston. In the position shown in the drawing the amount of fuel fed into the conduit 26 by an upward movement of the piston is relatively smaller than if the piston were rotated for 180 degrees about its axis, since in the latter case the slanting edge will earlier close the supply port.

An upward and downward movement is imparted to the piston by the engine by rotating a cam 27 bearing against a flange 28 of the piston and moving the same in opposition to a helical spring 29.

A rotary movement of the piston is controlled by a rod 30 having a rack portion 30' meshing with teeth 31 cut into the middle part of the piston 22. Thus the piston is permitted to make an upward and downward movement, while it may, at the same time, be rotated by means of the rod 30.

For actuation of the rod a device responsive to the pressure in the air intake conduit 15 downstream of the throttle 16 is provided. This device is shown as including a sylphon or bellows 32 actuating the rod 30 by means of a ball-joint 33 permitting a rotary relative movement between the parts. The sylphon is inclosed within a chamber housing 34 communicating with the air intake conduit by means of a pipe 35. The pressure may be read at a gage 35'.

So far as described the control device will operate in a conventional manner controlling the adjustment of the variable fuel supply means in response to the pressure inside the air intake conduit.

According to this invention further adjustments are provided for making the fuel supply means responsive to the inclination of the longitudinal axis of the craft with respect to the horizontal.

As an inclination responsive member there is shown a vertical gyro 36 which may be of conventional construction and which is well known in the art as an element. The vertical gyro 36 corrects the initial setting of the pressure responsive device 32. For this purpose a rod connection 37 is shown as connecting a crank pin of a nut 39 with the gyroscope, thereby rotating the nut in an inwardly threaded opening 40 of the chamber housing 34. The nut 39 is also inwardly threaded and fits on a threaded bolt 41 connected to the bellows. The inclination of the vertical gyro with respect to the craft therefore causes an axial movement of the sylphon relative to the chamber housing.

The threaded bolt is also provided with a crank pin 42 connected to a pressure responsive device which in the illustrated example is shown as being a sylphon 43 connected to the throat of a Venturi tube 44 exposed to the air surrounding the airplane. Upon a change of speed the sylphon 43 will expand or contract thereby actuating the crank pin 42 and also axially displacing the sylphon 32.

The operation of the device is as follows:

A certain amount of fuel is supplied to the engine upon each stroke of the same. Upon a decrease of the speed of the engine due to a climbing of the craft, the vertical gyro 36 causes the initial setting of the variable delivery pump to be readjusted for a richer mixture and vice versa.

Upon an increase in speed the bellows contracts and causes the adjustment of the bellows 32 and of the variable delivery pump 17 to be corrected for a thinner mixture and vice versa.

Obviously the present invention is not restricted to the particular embodiment herein shown and described. Moreover it is not indispensable that all the features of this invention be used conjointly, since they may be employed advantageously in various combinations and subcombinations.

What is claimed is:

1. A fuel supply system for an internal combustion engine for use on aircraft comprising means for supplying a fuel-air mixture to said engine; means for adjusting the relative fuel and air content; and means responsive to the forward speed of said engine for actuating said adjusting means so as to enrich the fuel-air mixture upon a decrease of the engine speed.

2. A fuel supply system for an internal combustion engine for use on aircraft comprising means for supplying a fuel-air mixture to said engine; means for adjusting the relative fuel and air content and means responsive to the inclination of the engine in the direction of travel with respect to the horizontal for actuating said adjusting means so as to enrich the fuel-air mixture in accordance with the climbing angle of the engine.

3. A fuel supply system for an internal combustion engine for use on aircraft comprising means for supplying a fuel-air mixture to said engine; means for adjusting the relative fuel and air content and means responsive to the forward velocity of the engine actuating said adjusting means so as to enrich the fuel-air mixture upon a decrease of the forward engine velocity.

4. A fuel supply system for an internal combustion engine having an intake manifold and throttle for use on aircraft comprising means for supplying a fuel-air mixture to said engine; means for adjusting the fuel amount; means responsive to the pressure of the combustion air flowing in the intake manifold between the throttle and said engine; said means being connected to actuate said fuel adjusting means; means responsive to the forward speed of said engine for additionally influencing said adjusting means so as to enrich the fuel-air mixture upon a decrease of the forward engine speed.

5. A fuel supply system for an internal combustion engine having an air intake manifold and throttle for use on aircraft comprising means for supplying a fuel-air mixture to said engine; means for adjusting the amount of fuel; means responsive to the pressure of the combustion air flowing in the intake manifold between the throttle and said engine; said means being connected to actuate said fuel adjusting means; means responsive to the inclination of the longitudinal axis of the engine with respect to the horizontal for additionally influencing said adjusting means so as to enrich the fuel-air mixture in accordance with the climbing angle.

6. A fuel supply system for an internal combustion engine having an air intake for use on aircraft comprising means for supplying a fuel-air mixture to said engine; means for adjusting the amount of fuel; means responsive to the pressure of the air in the intake; said pressure responsive means being connected to actuate said fuel adjusting means; means responsive to the forward velocity of the engine for additionally influencing said adjusting means so as to enrich the fuel-air mixture upon a decrease of the velocity.

7. A fuel supply system for an internal combustion engine for use on aircraft; said engine having an air intake conduit and a throttle therein; comprising means responsive to the air pressure in said intake conduit down-stream of said throttle; means for adjusting the amount of fuel connected to be actuated by said air pressure responsive means; and means responsive to the inclination of the engine with respect to the horizontal for additionally influencing said amount of fuel in accordance with the climbing angle of the engine.

8. A fuel supply system for an internal combustion engine for use on aircraft; said engine having an air intake conduit and a throttle therein; comprising means responsive to the air pressure in said intake conduit down-stream of said throttle; means for adjusting the amount of fuel connected to be actuated by said air pressure responsive means; and means responsive to the forward velocity of the engine including a pressure responsive device for additionally influencing said adjusting means so as to enrich the fuel-air mixture upon a decrease of the velocity.

9. A fuel supply system for an internal combustion engine for use on aircraft, said engine having an intake conduit and a throttle therein; comprising means for adjusting the amount of fuel and means jointly responsive to the air pressure in said intake conduit down-stream of said throttle, to the forward velocity and to an inclination of the engine with respect to the horizontal for actuating said fuel adjusting means so as to enrich the fuel-air mixture upon a decrease of the velocity and in response to the climbing angle of the engine.

10. A fuel supply system for an internal combustion engine for use on aircraft, said engine having an air intake conduit and a throttle therein, comprising a variable delivery pump connected to supply fuel to said engine; and means jointly responsive to the air pressure in said intake conduit downstream of said throttle and to an inclination of the engine with respect to the horizontal and connected to adjust said variable delivery pump.

11. A fuel supply system for an internal combustion engine for use on aircraft, said engine having an air intake conduit and a throttle therein, comprising a variable delivery pump connected to supply fuel to said engine; and means jointly responsive to the air pressure in said intake conduit downstream of said throttle and to the forward speed of the engine for adjusting said variable delivery pump.

12. A fuel supply system for an internal combustion engine for use on aircraft, said engine having an air intake conduit and a throttle therein, comprising a variable delivery pump connected to supply fuel into said intake conduit; and means jointly responsive to the air pressure in said intake conduit downstream of said throttle, to the forward speed of the engine and to the inclination of the engine with respect to the horizontal for adjusting said variable delivery pump.

EWALD BECKER.